United States Patent
Mironets et al.

(10) Patent No.: US 9,850,579 B2
(45) Date of Patent: Dec. 26, 2017

(54) FEEDSTOCK AND METHODS OF MAKING FEEDSTOCK FOR COLD SPRAY TECHNIQUES

(71) Applicant: Delavan Inc, West Des Moines, IA (US)

(72) Inventors: Sergey Mironets, Charlotte, NC (US); Thomas J. Martin, East Hampton, CT (US); Aaron T. Nardi, East Granby, CT (US); Alexander Staroselsky, Avon, CT (US)

(73) Assignee: Delavan, Inc., West Des Moines, IA (US)

( * ) Notice: Subject to any disclaimer, the term of this patent is extended or adjusted under 35 U.S.C. 154(b) by 0 days.

(21) Appl. No.: 14/872,061

(22) Filed: Sep. 30, 2015

(65) Prior Publication Data
US 2017/0088953 A1  Mar. 30, 2017

(51) Int. Cl.
C09D 7/12 (2006.01)
C23C 24/04 (2006.01)

(52) U.S. Cl.
CPC ............ *C23C 24/04* (2013.01); *C09D 7/1283* (2013.01); *C09D 7/1291* (2013.01)

(58) Field of Classification Search
None
See application file for complete search history.

(56) References Cited

U.S. PATENT DOCUMENTS

| | | | |
|---|---|---|---|
| 8,080,278 B2 | 12/2011 | Jabado et al. | |
| 8,839,887 B2 | 9/2014 | Xia et al. | |
| 2006/0090593 A1* | 5/2006 | Liu | B22F 1/0048 75/252 |
| 2011/0039024 A1* | 2/2011 | Jabado | C23C 24/04 427/201 |
| 2013/0095250 A1 | 4/2013 | Sato | |
| 2014/0170012 A1 | 6/2014 | Delisle et al. | |
| 2014/0336046 A1 | 11/2014 | Heinrich et al. | |
| 2016/0258068 A1* | 9/2016 | Klecka | B24C 1/003 |

* cited by examiner

*Primary Examiner* — Colin W. Slifka
(74) *Attorney, Agent, or Firm* — Locke Lord LLP; Scott D. Wofsy; Christopher J. Cillié

(57) ABSTRACT

A feedstock for a cold spray process includes a plurality of globule bodies. The globule bodies include a plurality of discrete particles bonded to one another to define porous globule bodies. The bonds between the particles are of sufficient strength such that the globule bodies can retain both the body integrity as well as the body shape when the body experiences acceleration from a conveying gas in a cold spray technique. Methods of making the feedstock and globule bodies are also described.

18 Claims, 4 Drawing Sheets

Droplet

Capillary

Funicular

Pendular

FEEDSTOCK AND METHODS OF MAKING FEEDSTOCK FOR COLD SPRAY TECHNIQUES

BACKGROUND OF THE INVENTION

1. Field of the Invention

The present disclosure relates to cold spray processes, and more particularly to feedstock and methods of making feedstock for gas dynamic cold spray processes.

2. Description of Related Art

Gas dynamic cold spray techniques (cold spray processes) are coating deposition techniques where solid powders are accelerated toward a substrate such that collision of the accelerated powder with the substrate causes the powder to bond with the underlying substrate. The solid powder typically impacts the underlying substrate with sufficient energy such that the particulate forming the powder undergoes plastic deformation and adheres to the underlying substrate. The kinetic energy of the particles is generally supplied by the gas used to convey the solid powder to the substrate, and is converted into plastic deformation energy upon impact and bonding to the substrate. The solid powder typically does not melt during the deposition process, and particulates forming the solid powder generally are on the order of about twenty (20) microns. Penetration of the solid powder into the substrate is a function of, among other things, the kinetic energy of the solid powder at impact to the substrate, heat loss, work hardening effects, the amount of radial dispersion the solid powder experiences prior to impacting the substrate, and the cleanliness of the substrate surface.

Such conventional cold spray feedstock and methods of making cold spray feedstock have generally been considered satisfactory for their intended purpose. However, there is still a need in the art for improved feedstock and methods of making feedstock for cold spray processes. The present disclosure provides a solution for this need.

SUMMARY OF THE INVENTION

A feedstock for a cold spray process includes a plurality of globule bodies. The globule bodies include a plurality of discrete particles bonded to one another to define porous globule bodies. The bonds between the particles are of sufficient strength such that the globule bodies can retain both the body integrity as well as the body shape when the body experiences acceleration from a conveying gas in a cold spray technique.

In certain embodiments, the globule bodies can have a spherical shape, such as a circular shape of substantially constant radius. The globule bodies can include micron or submicron sized particles. The globule bodies can have a globule size that is larger than about fifty (50) microns. In accordance with certain embodiments, the globule bodies can have a non-spherical shape. The globule bodies can have a globule size that is greater than about twenty-five (25) millimeters. The globule bodies can include a metallic material. The globule bodies can also be substantially free of oxides of the metallic material.

It is also contemplated that, in accordance with certain embodiments, each of the plurality of globule bodies can include a tip portion and an opposed heel portion. A surface can envelope the tip and heel portions. The surface can define a concavity that extends into the tip portion of the globule body to reduce the impact strength and increase coverage when the globule bodies impact a substrate surface in a cold spray process. The concavity can define a hollow tip structure defined on the tip portion of the globule body opposite the heel portion. The globule body can define a symmetry axis bisecting the tip portion and the heel portion, and the globule body can be symmetrical about the symmetry axis.

It is also contemplated that an article can include a substrate and at least layer overlaying the substrate. The layer (or layers) can be conformally disposed over the substrate and can include a plurality of particle bodies as described above that are deformed such the particle bodies conform to the underlying substrate. The layer can have a density that is greater than a density of the particles bodies prior to incorporation into the layer, being less porous for example.

A method of making feedstock for a cold spray process includes receiving particulate, such as a powder including a plurality of micron or submicron size particles. The particulate is agglomerated into one or more globules such as a plurality of particles are bonded to one another within the globule and one or more pores are defined within the globule. The globules are strengthened by applying heat to the globules and shaped such that the globules have spherical or non-spherical shapes.

In embodiments, the shape of the globules can be defined prior to strengthening the globules, coincident with strengthening the globules, and/or subsequent to strengthening the globules. Agglomerating the particulate can include using a dry agglomeration technique or a wet agglomeration technique. Strengthening the globules can include heating the globules at a temperature that is below the sintering temperature of the particulate forming the globules. Strengthening the globules can include sintering the globules. Shaping and/or strengthening the globules can be done using a free-gravity technique. Shaping the globules can include defining a concavity in a surface of one or more of the globules, such as by inserting the particulate into a mold. A deposition can be developed on a substrate by accelerating the globules toward the substrate with the concavity oriented toward the substrate or away from the substrate relative to the acceleration direction.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1A:
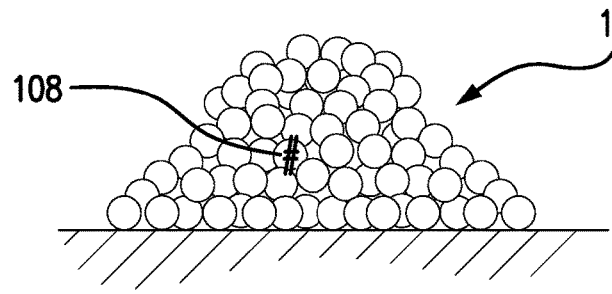
FIGS. 1A-1C is a schematic view of a method for making feed stock for a cold spray process, showing particulate being agglomerated into spherical globule bodies, strengthened through heating, and being accelerated toward a substrate.

Reference will now be made to the drawings wherein like reference numerals identify similar structural features or aspects of the subject disclosure. For purposes of explanation and illustration, and not limitation, a partial view of an exemplary embodiment of feedstock for a cold spray technique in accordance with the disclosure is shown in FIG. 1A and is designated generally by reference character 100. Other embodiments of feedstock for cold spray processes, methods of making such feedstock, or aspects thereof, are provided in FIGS. 1B-5, as will be described. The systems and methods described herein can be used for depositing layers on substrates using cold spray processes in power generation and vehicular applications, such as in aircraft landing gear.

Figure 1B:
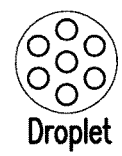
Figure 1B:
Figure 1B:
Figure 1B:
Figure 1B:
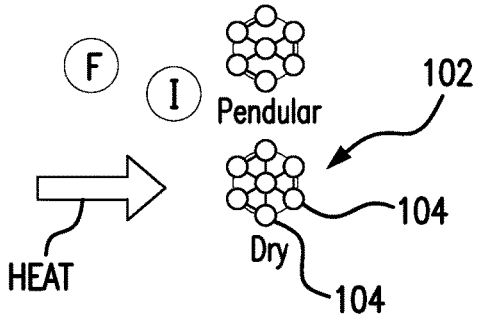
Figure 1C:
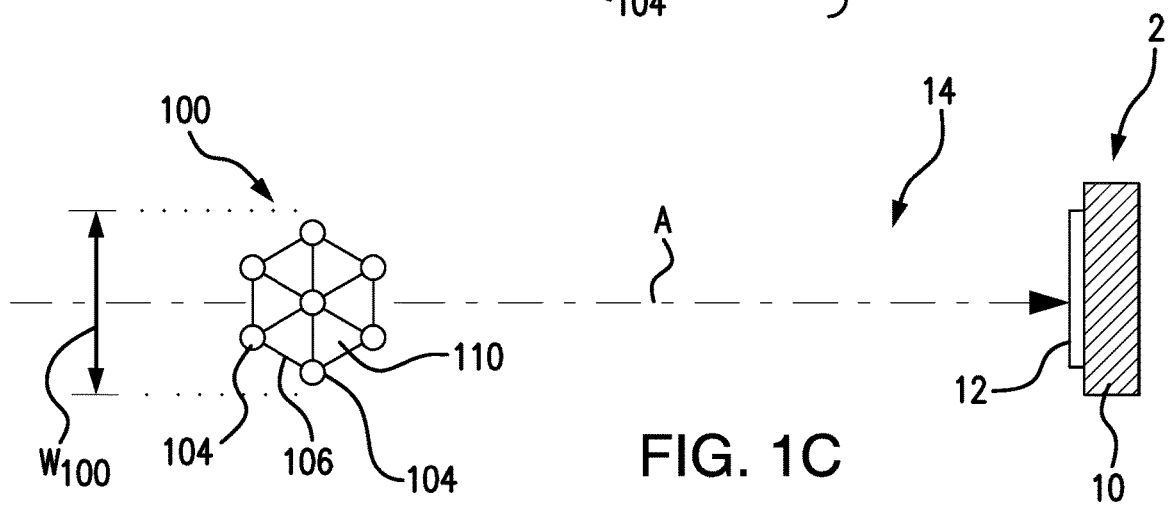

Referring to FIGS. 1A-1C, a feedstock for a cold spray process is generally indicated with reference numeral 100. Feedstock 100 includes a plurality of globule bodies 102. Globules 102 include a plurality of particles 104 that are integrally coupled to one another with bonds 106. Pores 110 are defined between adjacent particles 104, and have a controlled porosity distribution that allow for control density of globule body 102. Pores 110 reduce the density of globule bodies 102, reducing the amount of energy necessary to accelerate feedstock 100 during deposition and/or allowing for the use of feedstock that relatively large. In embodiments, feedstock 100 has a width $W_{100}$ that is greater than about one-hundred (100) microns. In certain embodiments, width $W_{100}$ of feedstock 100 is greater than about one-hundred and fifty (150) microns.

Particles 104 are micron or submicron sized particles that include a metallic material 108 from which a deposition 12 is formed overlaying a substrate 10 using a cold spray process 14. In this respect feedstock 100 is accelerated along an acceleration axis A towards substrate 10 where, upon impact, globule body 102 plastically deforms and bonds with underlying substrate 10. Examples of suitable metallic materials include aluminum, copper, and/or certain types of steel alloys.

Feedstock 100 is formed by receiving particulate 104, as shown in FIG. 1A, and agglomerating the received particulate 104 into a plurality of globule bodies, as shown in FIG. 1B, through a wet agglomeration technique or a dry agglomeration technique, and applying heat to globule body 102. As shown in FIG. 1C, agglomerating particulate into a globule causes particle body 102 to have a spherical shape. Applying heat to globule body 102 strengthens bonds 106 such that bonds 106 are of sufficient strength such that globule bodies 102 forming feedstock 100 remain structurally intact when accelerated along an acceleration axis A toward substrate 10.

Heat is applied using a free-gravity technique F, which allows globule body to retain its spherical shape notwithstanding the bond strengthening that occurs as a result of the heating. Heating may be such that particle bodies 102 of feedstock 100 have sufficient strength to withstand acceleration, but weak enough such that good coverage is provided upon impact with substrate 10. It is contemplated that the heating is done below the sintering temperature of the metallic material 108 forming particles 104. This limits the strength of the bonds developed between particles 104, enabling feedstock 100 to tolerate dynamic forces developed during acceleration but still provide sufficient coverage upon impact with substrate 10.

In the illustrated exemplary embodiment, at least one of agglomeration and heating are down in an inert atmosphere I. This prevents the formation of oxide of metallic material 108 on particles 104 within globule body 102. As will be appreciated by those of skill in the art, reducing or eliminating oxide can improve the properties of an article 2 including substrate 10 and deposition 12.

Figure 2A:
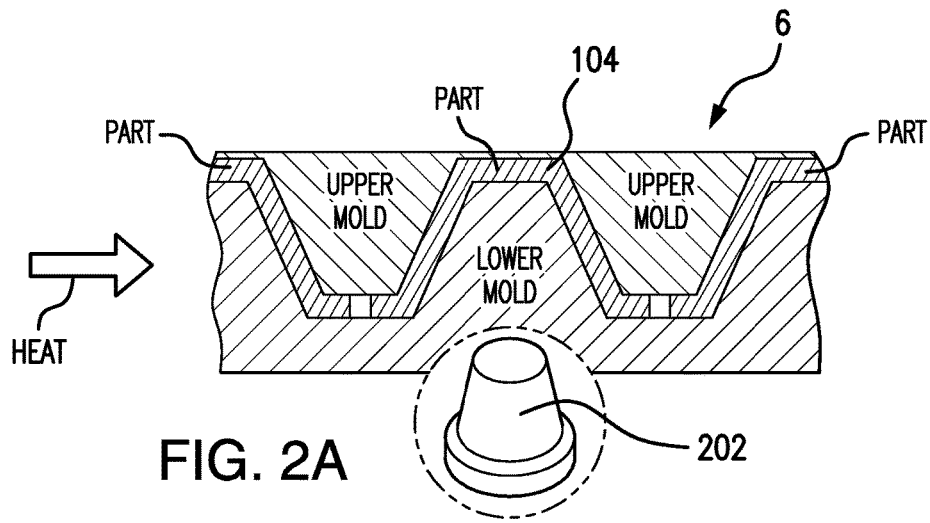
FIGS. 2A-2C is a schematic view of a method for making feed stock for a cold spray process, showing particulate being agglomerated into non-spherical globule bodies with concavities, strengthened through sintering, and being accelerated toward a substrate.
Figure 2B:
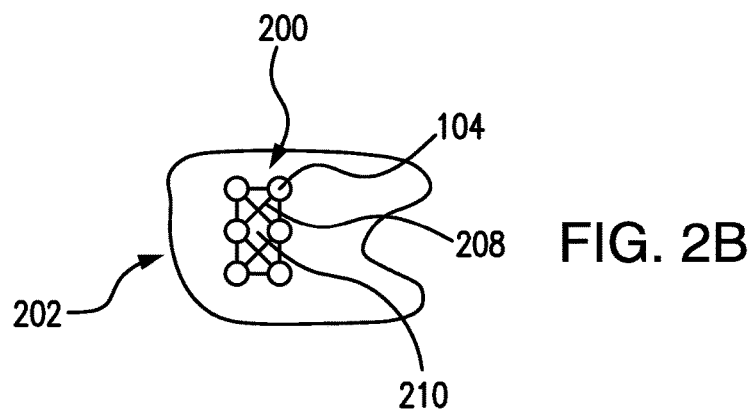
Figure 2C:
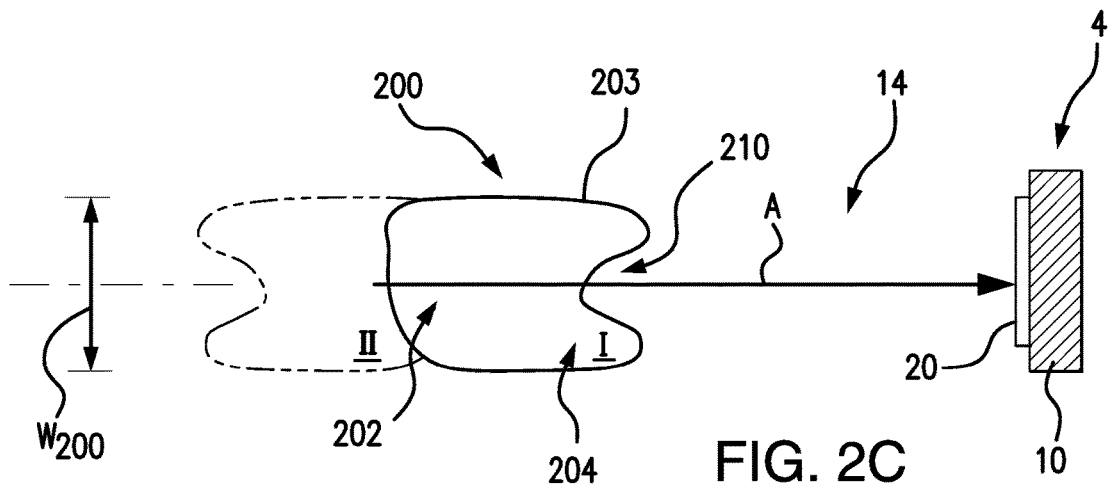

With reference to FIGS. 2A-2C, a feedstock 200 is shown. Feedstock 200 is similar to feedstock 100, and additionally includes a globule body 202 with a non-spherical shape. Globule body 202 includes a tip portion 204 and a heel portion 206 that are enveloped within a surface 208. Surface 208 includes a concavity 210 defined therein that facilitates coverage when feedstock 200 is accelerated along acceleration axis A toward substrate 10 to form a deposition 20 overlaying substrate 10.

With reference to FIG. 2A, globule body 202 is formed by receiving particles 104 in a rigid die 6. Die 6 has a cavity defined between upper and lower die portions wherein particles 104 adopt the non-spherical shape of globule body 202, for example with a concavity 210 (shown in FIG. 2B). Heat is applied to particles 104 such that bonds 206 form between adjacent particles 104, fixing respective particles 104 relative one with pores 208 defined within globule body 202. Bonds 206 are of sufficient strength that globule bodies 202 forming feedstock 200 maintain their shape and integrity during acceleration along axis A, but deform to provide suitable coverage upon impact with substrate 10. In embodiments, sintering is done using a free gravity technique, which can improve the density uniformity of porous globule body 202.

With reference to FIG. 2C, in embodiments, feedstock 200 has a size $W_{200}$ that is about 25 millimeters (1 inch). The heat applied to particles 104 while disposed within die 6 is applied at a temperature that is above the sintering temperature of material 108 (shown in FIG. 1A) forming particulate 104, thereby rendering bonds 208 of sufficient strength to maintain the integrity of globule body 202 when accelerated along acceleration axis A, but weak enough to have sufficient coverage as a result of impact with substrate 10. Globule body 202 may be accelerated toward substrate 10 such that concavity 210 is oriented toward substrate 10, as shown in solid outline orientation (I). Alternatively, globule body 202 may be accelerated toward substrate 10 such that concavity 210 in oriented on a side of globule body opposite substrate 10, as shown in dashed outline (II).

Figure 3A:
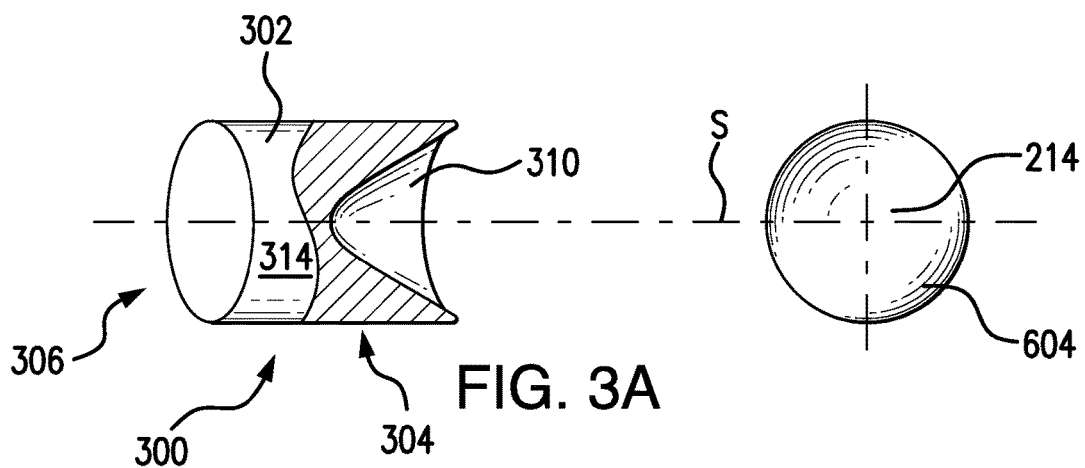
FIGS. 3A-3C are schematic views of exemplary embodiments non-spherical globule bodies for cold spray process feedstock, showing a globule body with a hollow tip, a globule body with cone shape, and a globule body with a dish shape.
Figure 4:
FIG. 4 is a plan view of a deposition formed on a substrate using a cold spray process, showing the a deposition having dispersion that is of greater area than the globule body used to form the deposition.

With reference to FIG. 3A, feedstock 300 is shown. Feedstock 300 is similar to feedstock 200, and additionally includes a radially symmetrical globule body 302. Globule body 302 is radially symmetrical about a symmetry axis S, and includes a tip portion 304, a heel portion 306 opposite tip portion 304, and a concavity 310 defined within a surface 314 of globule body 302. Concavity 310 defines a hollow tip structure 312. Hollow-tip structure 312 in configured to increase the deposition area of feedstock 300 upon impact with substrate 10. In this respect, impact of feedstock 300 with substrate 10 results in the particulate forming feedstock 300 to be distributed over an area that is greater than the cross-sectional area of feedstock 300, as shown in FIG. 4.

Figure 3B:
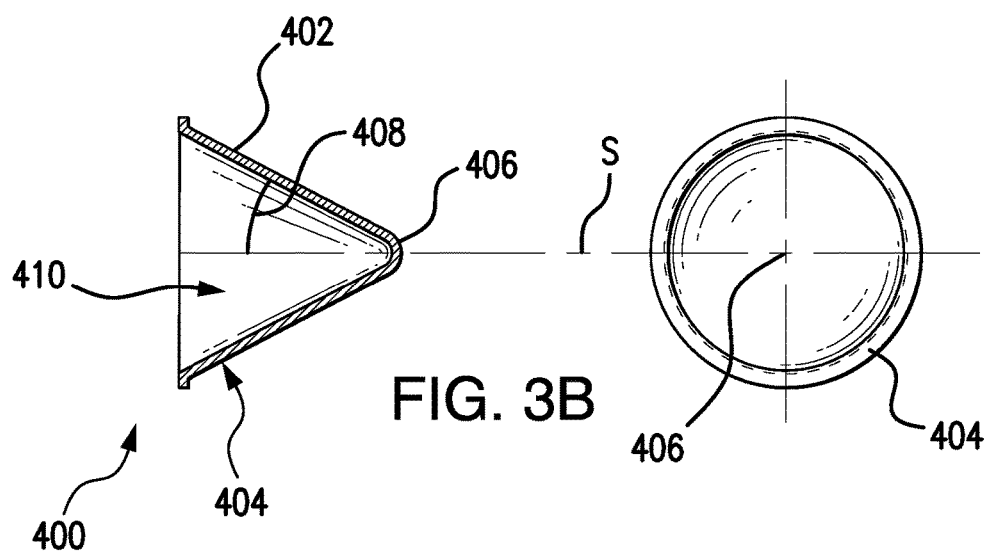

With reference to FIG. 3B, feedstock 400 is shown. Feedstock 400 is similar to feedstock 300, and additionally includes a conical globule body 402. Conical globule body 402 has a wall 404 that is radially symmetrical about a symmetry axis S and defines a hollow cone. Wall 404 bounds a concavity 410 on a first end. On a second end opposite the first end, wall 404 defines a tip 406. It is contemplated that feedstock 400 can be accelerated axis acceleration axis A (shown in FIG. 2C) with either tip 406 leading or concavity 410 leading, the tip leading orientation tending to increase impact area and reduce impact energy and the concavity leading orientation tending to reduce impact area and increase impact energy.

A wall angle 408 relative to symmetry axis S defines the slope wall 404 (in profile) relative to symmetry axis S. Wall angle 408 is selected to modulate the acceleration of globule body 402 upon impact with substrate 10, and further contributes to size of the area impacted by feedstock 400 upon impact with a substrate. In the illustrated exemplary embodiment wall angel 408 is about 45 degrees. It is to be understood and appreciated that other wall angle 408 may be smaller or larger than 45 degrees, as suitable for a given application.

Figure 3C:
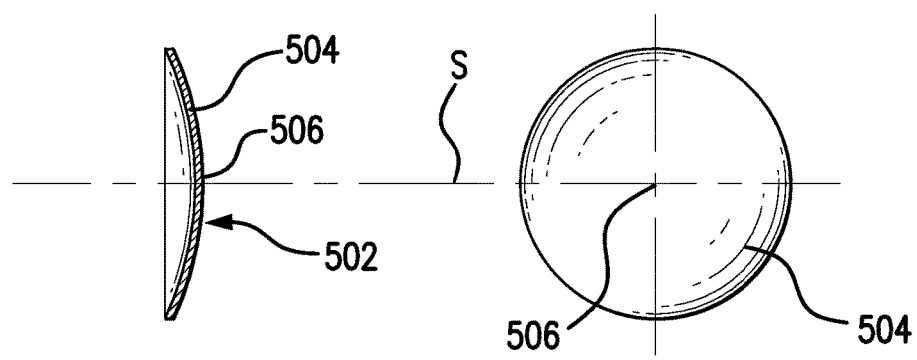

With reference to FIG. 3C, feedstock 500 is shown. Feedstock 500 is similar to feedstock 300, and additionally includes a dish-shaped globule body 502. Dish-shaped globule body 502 has a wall 504 that defines a dish shape that is radially symmetrical about a symmetry axis S. On a first end wall 504 bounds a concavity 510. On a second end wall 504 defines a tip 506. About symmetry axis S wall 504 defines an arcuate profile with a decreasing radius of curvature. The arcuate shape of the profile of disk-shaped globule body influences the coverage and kinetic energy when feedstock 500 impacts substrate 10 (shown in FIG. 2C).

Figure 5:
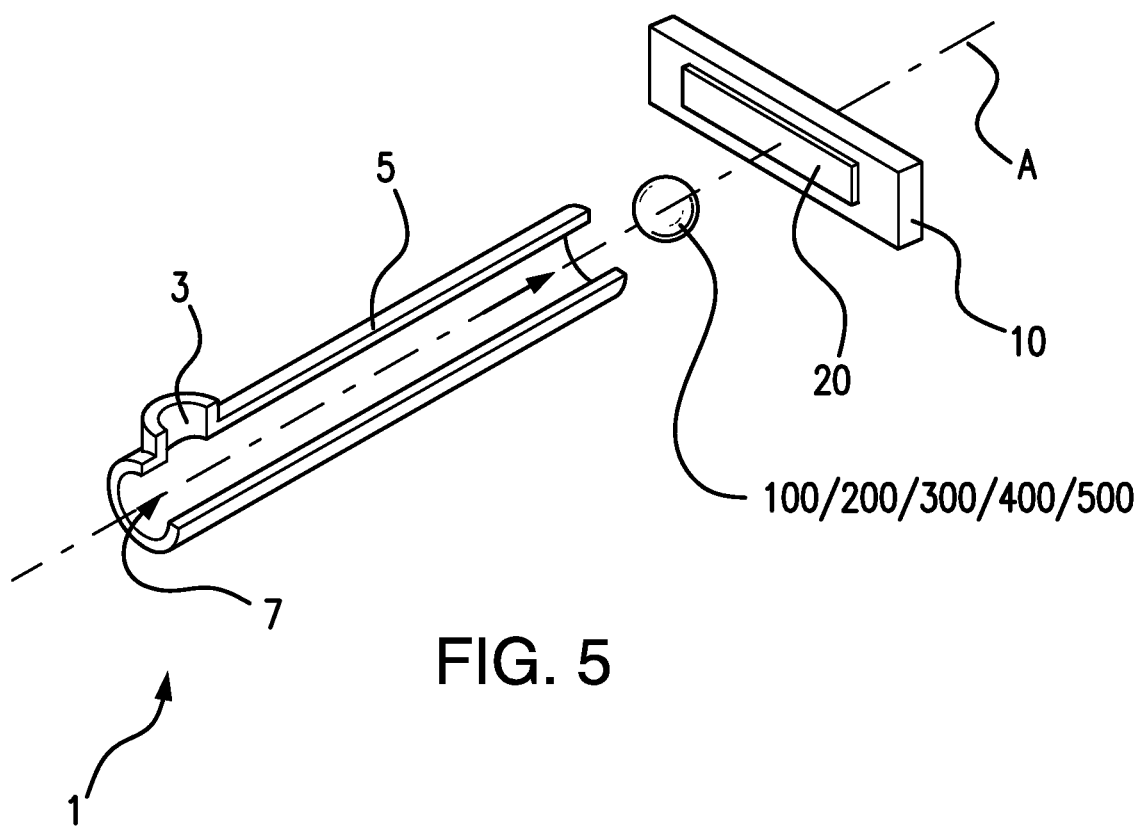
FIG. 5 is a perspective view an exemplary cold spray apparatus, shown a shock tube apparatus accelerating globule bodies of a feedstock toward a substrate.

With reference to FIG. 5, an exemplary embodiment of a cold spray apparatus 1 is shown. Cold spray apparatus 1 an accelerator tube 5 with a port 3 for introducing feedstock, e.g., feedstock 100 (shown in FIG. 1C), feedstock 200 (shown in FIG. 2B), feedstock 300 (shown in FIG. 3A), feedstock 400 (shown in FIG. 3B), and/or feedstock 500 (shown in FIG. 3C), and a gas port 7 for introducing a conveying gas into cold spray apparatus 1. Cold spray apparatus 1 may include a shock tube apparatus, which is in conjunction with the selected shape of the feedstock employed with the shock tube apparatus, may develop deposition 20 over substrate 10 with greater dispersion and less penetration than were the material forming the feedstock delivered to the substrate using a conventional cold spray technique. As will be appreciated by those of skill in the art in view of the present disclosure, employment a shock tube apparatus allows for higher gas temperatures and velocities of feedstock would otherwise be possible by flowing a carrier gas through a nozzle. Moreover, the use of relatively large globule bodies with greater thermal mass allows for higher gas temperatures as the thermal mass renders the feedstock more resistant to melting while being conveyed by the gas to the substrate.

Conventional cold spray techniques typically use relatively small, substantially spherical shaped particles having a specific size distribution. The particles are accelerated toward a substrate at high velocity to form a deposit on the substrate. The common understanding of cold spray techniques is that the kinetic energy of the accelerated particles enables bonding with the substrate and previously deposited particles by breaking the chemical bonds present within oxide films formed on the exterior of the particles. Variation in the oxide films present on the particle surfaces can influence properties of the bonding strength of the particles forming the resulting deposit, delamination, and/or internal artifacts developing when bonding strength is below a desired level. For that reason, conventional cold spray processes commonly employ specialized gases and/or gas conditioning techniques and are generally limited to materials with good ductility that do not exhibit strain hardening effects. Relatively brittle materials are typically more difficult to bond using conventional cold spray techniques, and generally require the addition of more ductile binder materials.

In embodiments described herein, feedstock for cold spray processes incorporate particulate into globule bodies that are relatively large relative to particles typically used in cold spray processes. Because the globule bodies arrive at the substrate as a coherent mass instead of a stream where particulate may have a radial component, cold spray processes employing feedstock as described herein are relatively efficient in terms of particulate usage. In certain embodiments, substantially allow the particulate incorporated into the globule bodies impacts the substrate. This eliminates that overspray phenomenon, which can render conventional cold spray techniques less efficient by comparison.

In certain embodiments, feedstock described herein can deliver particulate to the substrate with a greater kinetic energy than conventional cold spray processes. This is because the larger globule bodies forming the feedstock have greater thermal mass than the discrete particles typically used in cold spray processes. As a consequence, the conveying gas can have a relatively high pressure compared to carriers gases used in conventional cold spray processes as the globule bodies can be exposed to the higher temperatures that typically accompany the higher pressure without melting or becoming soft. The larger mass of the globule bodies can also provide less heat dissipation, better penetration into the substrate, and/or tighter coverage on the substrate.

The methods and systems of the present disclosure, as described above and shown in the drawings, provide feedstock and methods of making feedstock for additive manufacturing techniques with superior properties. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. Feedstock for a cold spray process, comprising:
 a plurality of globule bodies including a plurality of particles bonded to one another and defining therebetween at least one pore,
 wherein the bond is of sufficient strength for the globule to retain both integrity and shape while undergoing acceleration in a cold spray process,
 wherein the plurality of globule bodies are about twenty-five (25) millimeters in size.

2. Feedstock for a cold spray process, comprising:
 a plurality of globule bodies including a plurality of particles bonded to one another and defining therebetween at least one pore,
 wherein the bond is of sufficient strength for the globule to retain both integrity and shape while undergoing acceleration in a cold spray process,
 wherein each of the plurality of globule bodies include:

a tip portion and a heel portion opposite the tip portion; and a surface enveloping the heel and tip portions, wherein the surface defines a concavity that extends into the tip portion of the respective globule body to reduce impact strength and expand substrate coverage upon impact of the globule body using a cold spray process.

3. Feedstock as recited in claim 2, wherein the plurality of globule bodies have spherical shapes.

4. Feedstock as recited in claim 2, wherein the plurality of globule bodies are greater than fifty (50) microns in size.

5. Feedstock as recited in claim 2, wherein the plurality of globule bodies have non-spherical shapes.

6. Feedstock as recited in claim 2, wherein the tip portion defines a hollow tip portion disposed on an end of the globule body opposite the heel portion.

7. Feedstock as recited in claim 2, wherein the particle body defines a symmetry axis extending through the tip portion and the heel portion, the globule body being symmetrical about the symmetry axis.

8. Feedstock as recited in claim 2, wherein the globule body includes a metallic material that is substantially free of oxides of the metallic material.

9. Feedstock as recited in claim 2, wherein the particles included in the globule bodies are submicron or micron size particles.

10. A method of depositing a layer on a substrate including accelerating a feedstock as recited in claim 2, wherein the concavity opens away from or toward the substrate relative to the direction of acceleration.

11. A method making feedstock for a cold spray process, the method comprising:

receiving particulate;

agglomerating the particulate into a plurality globules;

strengthening the globules using heat; and shaping the globules, wherein the agglomerating the particulate includes bonding particles of the particulate such that one or more pores are defined within the globules, wherein the bond is of sufficient strength for the globule to retain both integrity and shape while undergoing acceleration in a cold spray process, wherein each of the plurality of globule bodies include:

a tip portion and a heel portion opposite the tip portion; and a surface enveloping the heel and tip portions, wherein the surface defines a concavity that extends into the tip portion of the respective globule body to reduce impact strength and expand substrate coverage upon impact of the globule body using a cold spray process.

12. The method as recited in claim 11, wherein shaping the globules includes imparting a substantially spherical shape to one or more of the globules.

13. The method as recited in claim 11, wherein shaping the globules includes imparting a non-spherical shape to one or more of the globules.

14. The method as recited in claim 11, wherein shaping the globules includes defining a concavity into a tip portion of one or more of the globules.

15. The method as recited in claim 11, wherein agglomerating the particulate into a plurality of globules further includes free-gravity sintering the agglomerated particulate in a mold.

16. The method as recited in claim 11, wherein agglomerating the particulate into a plurality of globules further includes free-gravity heating the agglomerated particulate at a temperature below a sintering temperature of the particulate.

17. The method as recited in claim 11, wherein agglomerating the particulate and strengthening the agglomerated particulate is performed within an inert atmosphere.

18. The method as recited in claim 11, wherein agglomerating the particulate includes agglomerating the particulate using a wet agglomeration technique.

* * * * *